(12) United States Patent
Lee

(10) Patent No.: US 11,028,889 B2
(45) Date of Patent: Jun. 8, 2021

(54) SELF-ENERGIZING BRAKE CALIPER

(71) Applicants: Kyung Chang Industrial Co., Ltd., Daegu (KR); Kwangjin Michael Lee, Novi, MI (US)

(72) Inventor: Kwangjin Michael Lee, Novi, MI (US)

(73) Assignees: Kwangjin Michael Lee, Novi, MI (US); KYUNG CHANG INDUSTRIAL CO., LTD., Daegu (KR)

( * ) Notice: Subject to any disclaimer, the term of this patent is extended or adjusted under 35 U.S.C. 154(b) by 147 days.

(21) Appl. No.: 16/592,002

(22) Filed: Oct. 3, 2019

(65) Prior Publication Data

US 2020/0124119 A1    Apr. 23, 2020

(30) Foreign Application Priority Data

Oct. 22, 2018   (KR) .......................... 10-2018-0125673

(51) Int. Cl.
*F16D 55/14*  (2006.01)
*F16D 55/2255*  (2006.01)
(Continued)

(52) U.S. Cl.
CPC .......... *F16D 55/2255* (2013.01); *B60T 1/065* (2013.01); *F16D 65/0056* (2013.01);
(Continued)

(58) Field of Classification Search
CPC .......... F16D 55/14; F16D 55/15; F16D 55/16; F16D 55/18; F16D 55/2245;
(Continued)

(56) References Cited

U.S. PATENT DOCUMENTS 3,207,267 A * 9/1965 Beuchle ............... F16D 55/2245
188/72.2
3,367,452 A * 2/1968 Baynes ............... F16D 55/2255
188/72.6
(Continued)

FOREIGN PATENT DOCUMENTS

FR     2340479 A1 *  9/1977  ......... F16D 55/2245
GB     947092 A *    1/1964  ........... F16D 55/228
(Continued)

OTHER PUBLICATIONS

Abstract of FR 2340479 (no date).*

*Primary Examiner* — Nicholas J Lane
(74) *Attorney, Agent, or Firm* — Nelson Mullins Riley & Scarborough LLP; Kongsik Kim, Esq.

(57) ABSTRACT

According to the present disclosure, there is provided a self-energizing brake caliper which comprises a caliper bracket fixed to a vehicle frame and comprising a rotation axis extending in the height direction of the vehicle; a first caliper arm rotatably connected to the rotation axis; a second caliper arm rotatably connected to the rotation axis and crossing the first caliper arm; an inboard brake pad; and an outboard brake pad. The first caliper arm is slidably connected at a first end of the inboard brake pad in the inboard side of the brake disc and the outer end of the first caliper arm is connected to a second end of the outboard brake pad. The second caliper arm is connected to the second end of the inboard brake pad in the inboard side of the brake disc and the outer end of the second caliper arm is slidably connected to the first end of the outboard brake pad. The driving force of an actuator is transferred to the inner ends of the first caliper arm and the second caliper arm.

12 Claims, 4 Drawing Sheets

(51) Int. Cl.
*B60T 1/06* (2006.01)
*F16D 65/00* (2006.01)
*F16D 65/18* (2006.01)
*F16D 55/00* (2006.01)
*F16D 125/64* (2012.01)
*F16D 125/68* (2012.01)

(52) U.S. Cl.
CPC ......... *F16D 65/0075* (2013.01); *F16D 65/18* (2013.01); *F16D 2055/002* (2013.01); *F16D 2055/0008* (2013.01); *F16D 2125/64* (2013.01); *F16D 2125/68* (2013.01)

(58) Field of Classification Search
CPC ............ F16D 2127/08; F16D 2125/64; F16D 2125/645; F16D 2125/68; F16D 55/2255
See application file for complete search history.

(56) References Cited

U.S. PATENT DOCUMENTS

| | | | |
|---|---|---|---|
| 3,749,206 A * | 7/1973 | Dence | F16D 55/2245 188/72.2 |
| 5,012,901 A | 5/1991 | Campbell et al. | |
| 6,135,243 A * | 10/2000 | Kraihanzel | F16D 55/224 188/171 |
| 6,318,513 B1 | 11/2001 | Dietrich et al. | |
| 9,932,051 B2 | 4/2018 | Suzuki | |
| 2005/0139435 A1 | 6/2005 | Jelley et al. | |
| 2008/0230330 A1 | 9/2008 | Herr | |
| 2009/0065311 A1 | 3/2009 | Kim | |
| 2012/0024639 A1 | 2/2012 | Castro | |
| 2020/0223403 A1 * | 7/2020 | Lee | F16D 55/2245 |

FOREIGN PATENT DOCUMENTS

| | | |
|---|---|---|
| JP | 2018-528363 A | 9/2018 |
| KR | 10-2000-0046028 A | 7/2000 |
| KR | 10-0837974 B1 | 6/2008 |
| KR | 10-2012-0074474 A | 7/2012 |
| KR | 10-1262832 B1 | 5/2013 |
| KR | 10-1509976 B1 | 4/2015 |
| KR | 10-2016-0122247 A | 10/2016 |
| KR | 10-2017-0026797 A | 3/2017 |
| KR | 10-2017-0104771 A | 9/2017 |
| KR | 10-2018-0048814 A | 5/2018 |

* cited by examiner

SELF-ENERGIZING BRAKE CALIPER

CROSS-REFERENCE TO RELATED APPLICATION

The present application claims priority to Korean Patent Application No. 10-2018-0125673 filed on Oct. 22, 2018, the entire contents of which are incorporated herein by reference.

TECHNICAL FIELD

The present disclosure relates to a self-energizing brake caliper.

BACKGROUND ART

In a hydraulic brake system, a driver presses a brake pedal so that the pressure generated by a master cylinder is transferred to braking force by disc brake caliper or drum brake wheel cylinder. A self-energizing brake for amplifying the braking force has been known. For example, the self-energizing brake using a ball and ramp is disclosed by U.S. Pat. No. 5,012,901 and the self-energizing brake using wedge-effect is disclosed by U.S. Pat. No. 6,318,513, U.S. Patent Application Publication Nos. 2008/0230330A1 and 2009/0065311A1.

The self-energizing brake according to the prior arts has complex structure, low productivity and high manufacturing costs. In particular, many reasons including self-locking effects in the wedge structure makes the self-energizing brake inapplicable.

Brake-by-wire system uses EMB (electro-mechanical brake) caliper driven by an electric motor. In order to apply the caliper in a front-wheel disc brake, the braking force generated by the motor should be greatly amplified.

SUMMARY

Accordingly, the present disclosure has been made in view of the above-mentioned problems occurring in the prior art, and it is an object of the present disclosure to provide a self-energizing brake caliper having no self-locking while the braking force generated by a hydraulic cylinder or a motor is greatly amplified, thereby serving excellent braking force.

To accomplish the above-mentioned object, according to the present disclosure, there is provided a self-energizing brake caliper comprising: a caliper bracket fixed to a vehicle frame and comprising a rotation axis extending in the height direction of the vehicle; a first caliper arm rotatably connected to the rotation axis; a second caliper arm rotatably connected to the rotation axis and crossing the first caliper arm; an inboard brake pad; and an outboard brake pad.

The first caliper arm is slidably connected at a first end of the inboard brake pad in the inboard side of the brake disc and the outer end of the first caliper arm is connected to a second end of the outboard brake pad.

The second caliper arm is connected to the second end of the inboard brake pad in the inboard side of the brake disc and the outer end of the second caliper arm is slidably connected to the first end of the outboard brake pad.

The driving force of an actuator is transferred to the inner ends of the first caliper arm and the second caliper arm.

The first caliper arm can be provided in the upper side of the second caliper arm.

The self-energizing brake caliper can further comprise a first guide member and a second guide member. The first caliper arm comprises a first mounting hole; the second caliper arm comprises a second mounting hole; the first end of the inboard brake pad comprises a first slot; and the first end of the outboard brake pad comprises a second slot. The first guide member can pass through the first mounting hole and the first slot. The second guide member can pass through the second mounting hole and the second slot. The first guide member and the second guide member can slide along the first slot and the second slot, respectively.

The first slot can be provided at both of the upper side and the lower side of the inboard brake pad; and the second slot can be provided at both of the upper side and the lower side of the outboard brake pad.

The inner end of the first caliper arm and the inner end of the second caliper arm can move away from each other by the driving force in braking operation.

The caliper bracket can comprise a mounting surface and through-hole formed closely to the mounting surface. The first caliper arm can be connected to the caliper bracket in the upper side of the mounting surface. The second caliper arm can pass through the through-hole in the lower side of the mounting surface to be connected to the caliper bracket.

A first distance between the rotation axis and the point where the driving force acts can be longer than a second distance between the rotation axis and the outer end of the first caliper arm. The first distance is the distance along the rotation axis of the brake disc. The second distance can be the distance along the longitudinal direction of the brake pads.

BRIEF DESCRIPTION OF DRAWINGS

The present disclosure will be more fully understood from the following detailed description taken in conjunction with the accompanying drawings.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, the present disclosure will be described in detail with reference to the accompanying drawings. As those skilled in the art would realize, the described embodiments may be modified in various different ways, all without departing from the spirit or scope of the present disclosure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" or "connected" denotes a physical relationship between two components whereby the components are either directly connected to one another or indirectly connected via one or more intermediary components. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, the term "inboard" means the vehicle side of the brake disc, and the term "outboard" means the opposite side of the vehicle side.

Figure 1:
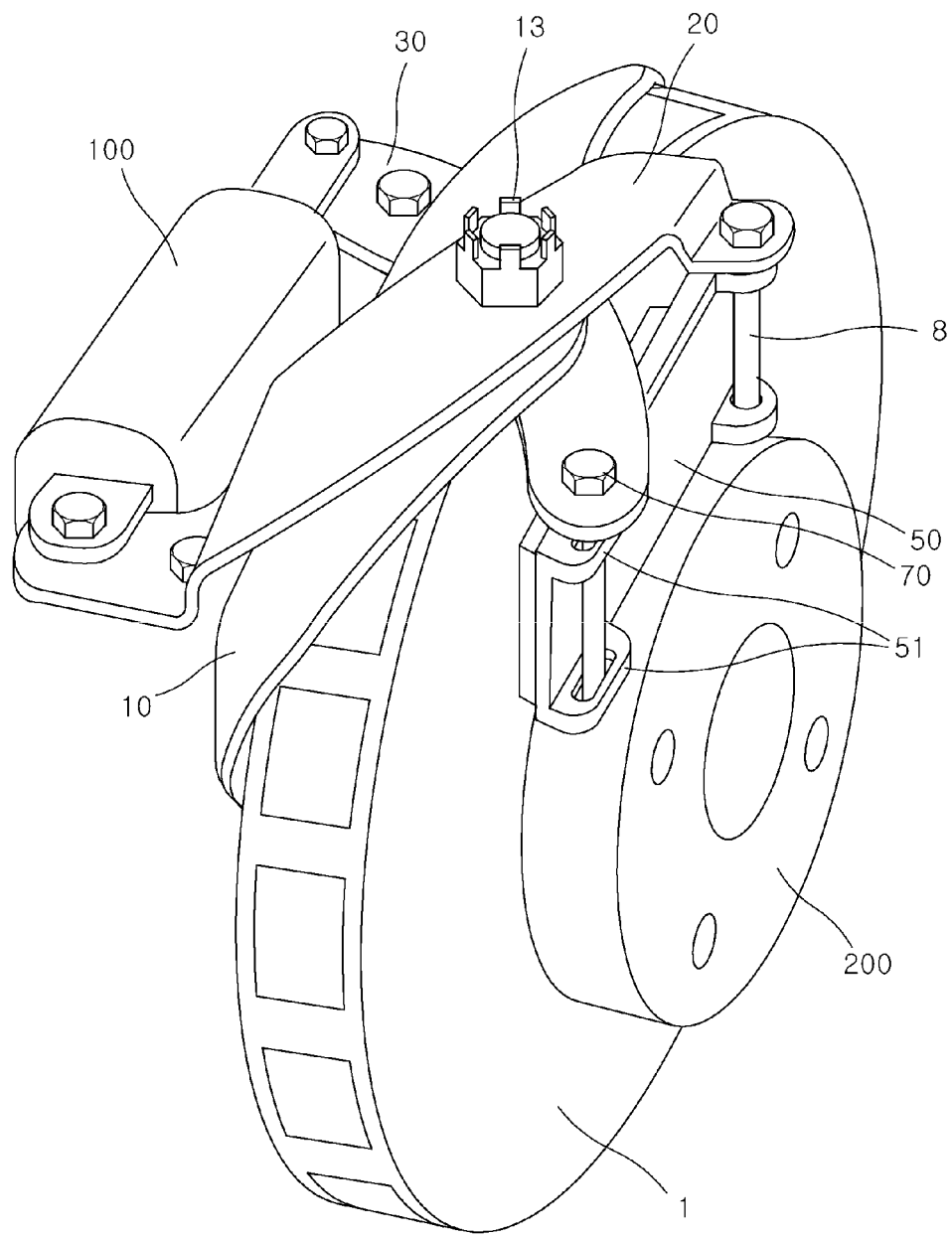
FIG. 1 shows a perspective view of a brake disc where a self-energizing brake caliper according to the present disclosure is mounted.
Figure 2:
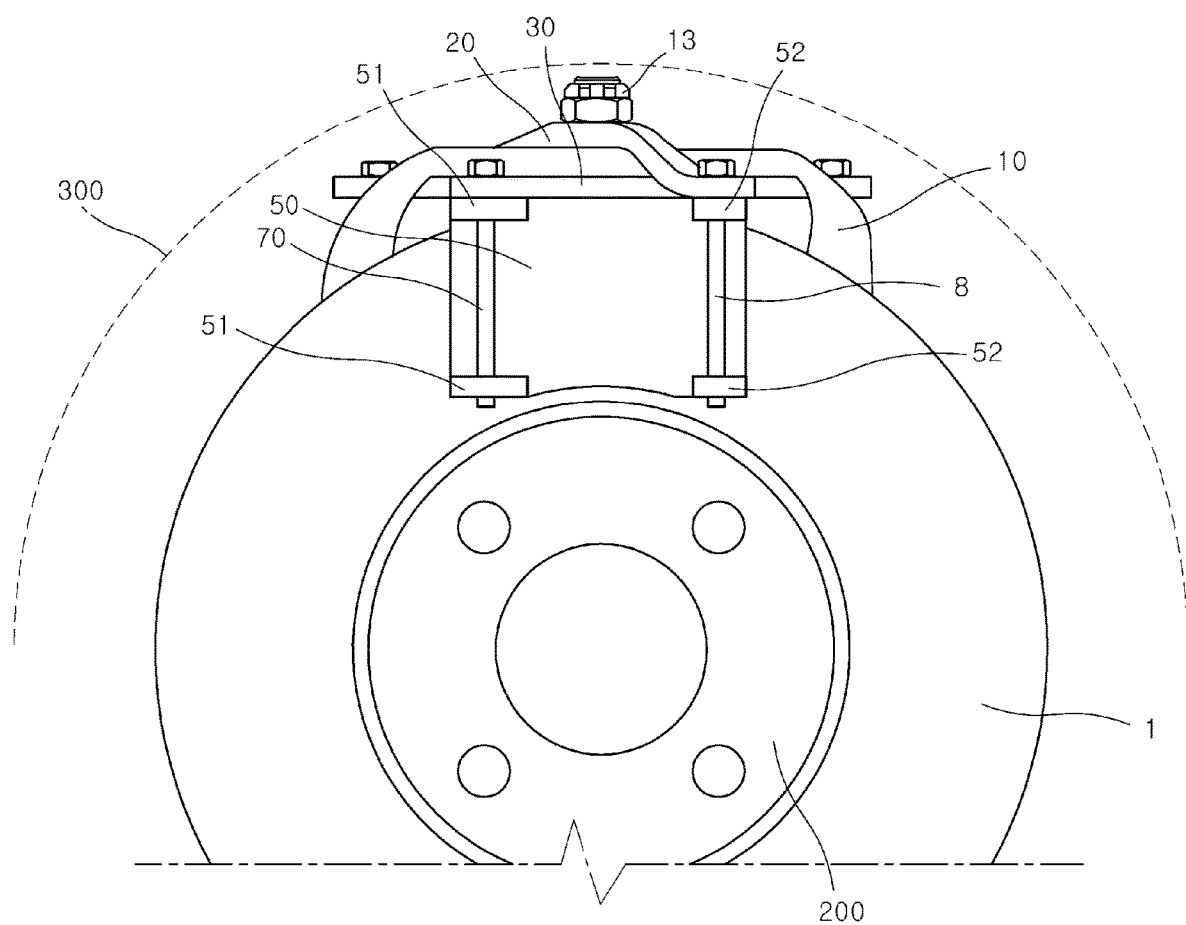
FIG. 2 shows a front view of the brake disc of FIG. 1, viewed from the outboard direction FIG. 1.
Figure 3:
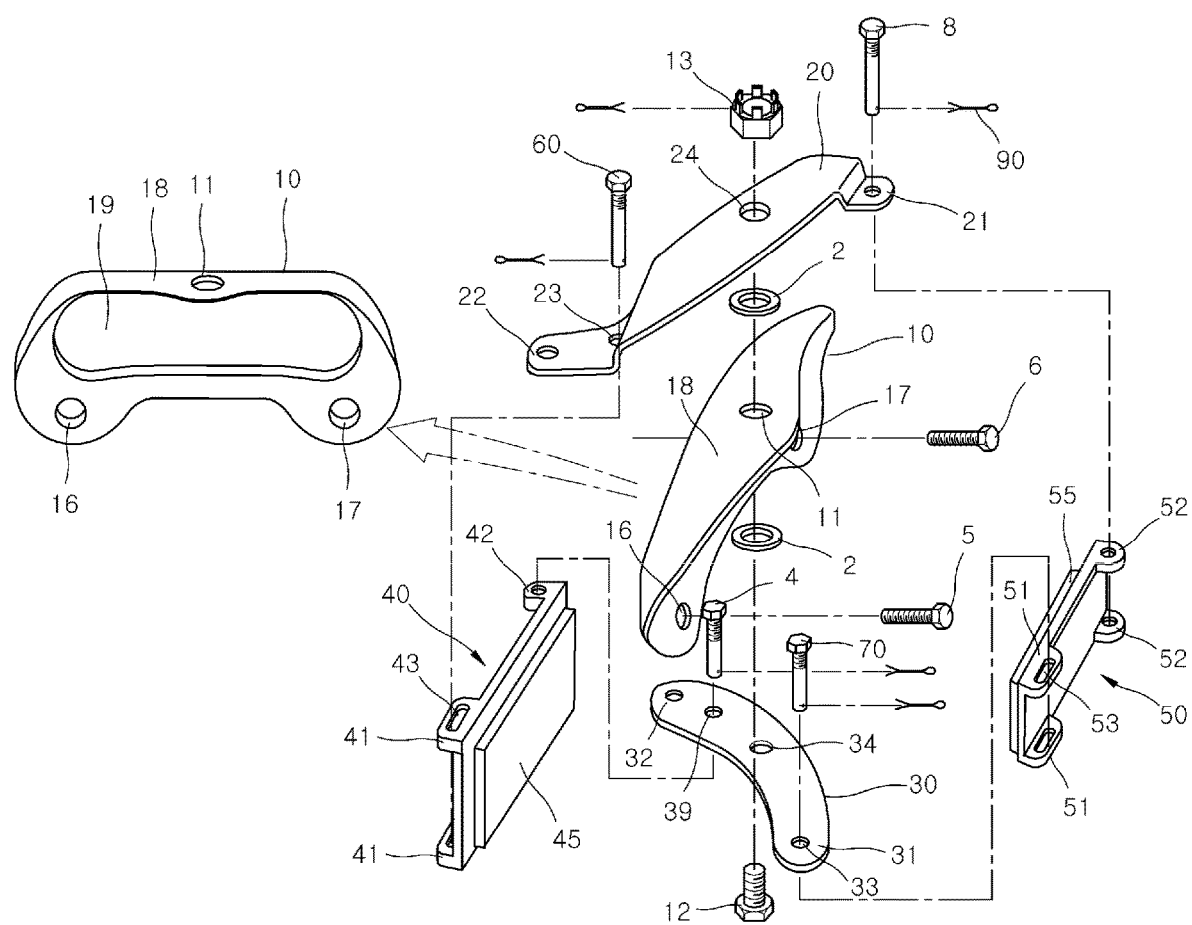
FIG. 3 shows an exploded perspective view of the self-energizing brake caliper and the brake pads according to the present disclosure.

FIG. 1 shows a perspective view of a brake disc where a self-energizing brake caliper according to the present disclosure is mounted; FIG. 2 shows a front view of the brake disc of FIG. 1, viewed from the outboard direction of FIG. 1; and FIG. 3 shows an exploded perspective view of the self-energizing brake caliper and the brake pads according to the present disclosure.

The self-energizing brake caliper according to the present disclosure comprises a caliper bracket (10), a first caliper arm (20), a second caliper arm (30), an inboard brake pad (40) and an outboard brake pad (50). The first caliper arm (20) and the second caliper arm (30) are provided so as to be crossed to each other.

The caliper bracket (10) is fixed to a vehicle frame and comprises a rotation axis (12) which extends vertically or between 9 o'clock and 3 o'clock in the direction of height of the brake disc. The caliper bracket (10) can be fixed to a vehicle frame by use of mounting bolts (5, 6). The vehicle frame is a portion which does not rotate while wheels rotate. For example, a suspension knuckle can be the vehicle frame. The caliper bracket (10) can comprise a mounting surface (18) and a through-hole (19). The through-hole (19) can be formed closely to the mounting surface (18).

A pivot bolt (12) can be the rotation axis. The pivot bolt (12) can pass through a mounting hole (11) of the caliper bracket (10) and rotatably connect the first caliper arm (20) and the second caliper arm (20) to the caliper bracket (10). The end of the pivot bolt (12) can be fastened by a castle nut (13) for preventing it from loosening. A thrust washer (2) or a thrust bearing can be used between the caliper arms (20, 30) and the caliper bracket (10) for smooth rotation of the caliper arms (20, 30).

The first caliper arm (20) can be fastened to the caliper bracket (10) at the upper side of the mounting surface (18) of the caliper bracket (10). The second caliper arm (30) can pass through the through-hole (19) and can be fastened to the caliper bracket (10) at the lower side of the mounting surface (18).

The actuator (100) of the present disclosure is a device for generating braking force to be applied to the braking pads so that the first caliper arm (20) and the second caliper arm (30) can perform scissor movement. The actuator (100) can be a hydraulic cylinder for a hydraulic braking system, or a power pack for a brake-by-wire system which comprises an electric motor, reducer, displacement sensor, force sensor and the like. The actuator (100) can be a cable-type device, for example, a direct pull which is used in bicycles or motor cycles. Any other device that allows the first caliper arm (20) and the second caliper arm (30) to perform scissor movement can be used as the actuator of the present disclosure.

The first caliper arm (20) can comprise an outer end (21), an inner end (22), and a first mounting hole (23). The outer end (21) is connected to a second end (52) of the outboard brake pad (50). A mounting bolt (8) passes through the mounting hole of the outer end (21) and the mounting hole formed at the second end (52) of the outboard brake pad (50) to fasten the outer end (21) and the second end (52) to each other. The fastening pin (90) which passes through the end of the mounting bolt (8) can prevent the mounting bolt (8) from escaping. A castle nut can be fastened to the end of the mounting bolt (8) instead of the fastening pin (90) in order to obtain stronger fastening.

A first guide member (60) passes through a first slot (43) formed at a first end (41) of the inboard brake pad (40) and the first mounting hole (23) to fasten the first caliper arm (20) to the inboard brake pad (40). The first slot (43) can extend along the longitudinal direction of the inboard brake pad (40). A fastening pin (90) passes through the end of the first guide member (60) to prevent the first guide member (60) from escaping. A castle nut can be fastened to the end of the first guide member (60) instead of the fastening pin (90) in order to obtain stronger fastening. The first slot (43) can be provided at both of the upper side and the lower side of the inboard brake pad (40). The first slot (43) can be provided in parallel with the friction surface of the friction member (45).

The driving force of the actuator (100) is transferred to the inner end (22) of the first caliper arm (20).

The second caliper arm (30) can comprise an outer end (31), an inner end (32), and a second mounting hole (33). The outer end (31) is slidably connected to the first end (51) of the outboard brake pad (50). A second guide member (70) passes through a second slot (53) formed at the first end (51) of the outboard brake pad (50) and the second mounting hole (33) to fasten the second caliper arm (30) to the outboard brake pad (50). The second guide member (70) is provided to slidably move along the second slot (53). The second slot (53) can extend along the longitudinal direction of the outboard brake pad (50). The fastening pin (90) which passes through the end of the second guide member (70) can prevent the second guide member (70) from escaping. A castle nut can be fastened to the end of the mounting bolt (8) instead of the fastening pin (90) in order to obtain stronger fastening. The second slot (53) can be provided at both of the upper side and the lower side of the outboard brake pad (50). The second slot can be provided in parallel with the friction surface of the friction member (55).

A mounting bolt (4) passes through a mounting hole formed at the second end (42) of the inboard brake pad (40) to connect the second caliper arm (30) to the second end (42) of the inboard brake pad (40). The fastening pin (90) which passes through the end of the mounting bolt (4) can prevent the mounting bolt (4) from escaping. A castle nut can be fastened to the end of the first guide member (60) instead of the fastening pin (90) in order to obtain stronger fastening.

The driving force of the actuator (100) is transferred to the inner end (32) of the second caliper arm (30).

The inboard brake pad (40) can comprise a friction member (45) which contacts with the brake disc (1). The outboard brake pad (50) can comprise a friction member (55) which contacts with the brake disc (1).

The length of the first slot (43) and the second slot (53) can be determined so that the scissor movement of the first caliper arm (20) and the second caliper arm (30) can be performed until the friction members (45, 55) are completely worn out.

Figure 4:
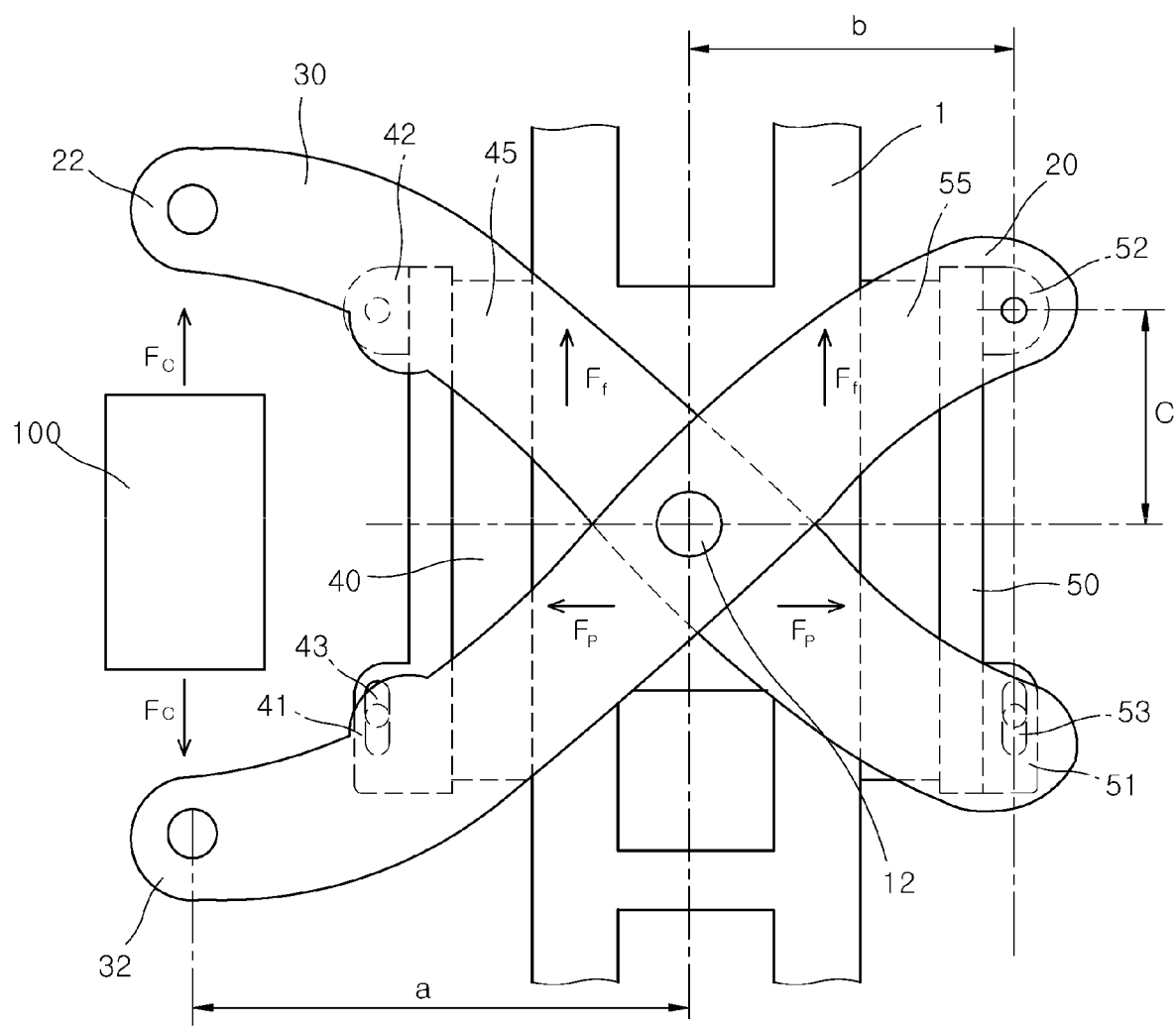
FIG. 4 shows a conceptual plan view for explaining the operation of the self-energizing brake caliper of the present disclosure.

The operation of the present disclosure is explained with reference to FIG. 4. The caliper bracket (10) is not illustrated in FIG. 4 for easy explanation. It is assumed that the brake disc (1) rotates in clockwise direction when it is viewed from the outboard.

The driving force ($F_0$) from the actuator (100) pushes the first caliper arm (20) and the second caliper arm (30) away from each other. The first caliper arm (20) rotates in counterclockwise direction at the rotation axis (12) and the second caliper arm (30) rotates in clockwise direction at the rotation axis (12). The first guide member (60) slides along the first slot (43) and the second guide member (70) slides along the second slot (53).

The friction members (45, 55) are maintained in parallel to each other while the caliper arms (20, 30) perform scissor movement because the first slot (43) is provided in parallel with the friction surface of the friction member (45) and the second slot is provided in parallel with the friction surface of the friction member (55).

The force that the outboard brake pad (50) presses the brake disc (1) is more amplified by the rotation of the first caliper arm (20) because the outer end (21) of the first caliper arm (20) is connected to the second end (52) of the outboard brake pad (50). The force that the outboard brake pad (50) presses the brake disc (1) is $$``F_0 \times \frac{a}{c}".$$

Consequently, the brake disc (1) can be pressed by the force which is stronger than the force generated by the actuator (100). Thus, the braking force is amplified by the present disclosure. The amplification effect is also provided by the second caliper arm (30) because the second caliper arm (30) is connected to the second end (42).

Friction force ($F_f$) is generated by the rotation of the brake disc (1) when the inboard brake pad (40) and the outboard brake pad (50) press the brake disc (1). The friction force ($F_f$) generates the moment that rotates the first caliper arm (20) and the second caliper arm (30) toward the brake disc (1). The force ($F_p$) that the inboard caliper arm (20) and the second caliper arm (30) press the brake disc (1) is more amplified by the rotation moment, thereby maximizing the self-energizing effects.

When the vehicle travels in reverse, the brake disc (1) rotates in counterclockwise direction, thereby reversing the direction of the friction force ($F_f$). In that case, the braking force can be lowered (de-energizing effect). However, the amplification of the braking force by the leverage effect is as explained in the above. Thus, the self-energizing effect of the braking force is more than the conventional arts even when the vehicle travels in reverse. Further, the vehicle generally travels in a lower speed when it travels in reverse. Thus, there is no problem in spite of the less self-energizing effect compared to the forward travel.

When the brake is released, the force generated by the actuator (100) is in the opposition direction of the driving force ($F_0$), thereby pulling the first caliper arm (20) and the second caliper arm closer to each other. The caliper arms (20, 30) move the inboard brake pad (40) and the outboard brake pad (50) away from the brake disc (1), thereby removing the force ($F_p$) that the inboard and outboard brake pads (40, 50) press the brake disc (1).

According to the present disclosure, self-locking is not occurred unlike the wedge structure because the self-energizing effect in braking and releasing is generated by the linkage performing scissor movement.

Although the present disclosure has been described with reference to accompanying drawings, the scope of the present disclosure is determined by the claims described below and should not be interpreted as being restricted by the embodiments and/or drawings described above. It should be clearly understood that improvements, changes and modifications of the present disclosure disclosed in the claims and apparent to those skilled in the art also fall within the scope of the present disclosure. Accordingly, this description is to be taken only by way of example and not to otherwise limit the scope of the embodiments herein.

What is claimed is:

1. A self-energizing brake caliper comprising:
   a caliper bracket fixed to a vehicle frame and comprising a rotation axis extending in the height direction of the vehicle;
   a first caliper arm rotatably connected to the rotation axis;
   a second caliper arm rotatably connected to the rotation axis and crossing the first caliper arm;
   an inboard brake pad; and
   an outboard brake pad;
   wherein the first caliper arm is slidably connected at a first end of the inboard brake pad in the inboard side of the brake disc and the outer end of the first caliper arm is connected to a second end of the outboard brake pad;
   wherein the second caliper arm is connected to the second end of the inboard brake pad in the inboard side of the brake disc and the outer end of the second caliper arm is slidably connected to the first end of the outboard brake pad; and
   wherein the driving force of an actuator is transferred to the inner ends of the first caliper arm and the second caliper arm.

2. The self-energizing brake caliper according to claim 1, wherein the first caliper arm is provided in the upper side of the second caliper arm.

3. The self-energizing brake caliper according to claim 1, further comprising a first guide member and a second guide member,
   wherein the first caliper arm comprises a first mounting hole; the second caliper arm comprises a second mounting hole; the first end of the inboard brake pad comprises a first slot; and the first end of the outboard brake pad comprises a second slot;
   wherein the first guide member passes through the first mounting hole and the first slot; the second guide member passes through the second mounting hole and the second slot; and
   wherein the first guide member and the second guide member slide along the first slot and the second slot, respectively.

4. The self-energizing brake caliper according to claim 2, further comprising a first guide member and a second guide member,
   wherein the first caliper arm comprises a first mounting hole; the second caliper arm comprises a second mounting hole; the first end of the inboard brake pad comprises a first slot; and the first end of the outboard brake pad comprises a second slot;

wherein the first guide member passes through the first mounting hole and the first slot; the second guide member passes through the second mounting hole and the second slot; and wherein the first guide member and the second guide member slide along the first slot and the second slot, respectively.

5. The self-energizing brake caliper according to claim 3, wherein the first slot is provided at both of the upper side and the lower side of the inboard brake pad; and the second slot is provided at both of the upper side and the lower side of the outboard brake pad.

6. The self-energizing brake caliper according to claim 4, wherein the first slot is provided at both of the upper side and the lower side of the inboard brake pad; and the second slot is provided at both of the upper side and the lower side of the outboard brake pad.

7. The self-energizing brake caliper according to claim 1, wherein the inner end of the first caliper arm and the inner end of the second caliper arm move away from each other by the driving force in braking operation.

8. The self-energizing brake caliper according to claim 2, wherein the inner end of the first caliper arm and the inner end of the second caliper arm move away from each other by the driving force in braking operation.

9. The self-energizing brake caliper according to claim 1, wherein the caliper bracket comprises a mounting surface and a through-hole formed closely to the mounting surface; the first caliper arm is connected to the caliper bracket in the upper side of the mounting surface; and the second caliper arm passes through the through-hole in the lower side of the mounting surface to be connected to the caliper bracket.

10. The self-energizing brake caliper according to claim 2, wherein the caliper bracket comprises a mounting surface and a through-hole formed closely to the mounting surface; the first caliper arm is connected to the caliper bracket in the upper side of the mounting surface; and the second caliper arm passes through the through-hole in the lower side of the mounting surface to be connected to the caliper bracket.

11. The self-energizing brake caliper according to claim 1, wherein a first distance between the rotation axis and the point where the driving force acts is longer than a second distance between the rotation axis and the outer end of the first caliper arm; the first distance is the distance along the rotation axis of the brake disc; and the second distance is the distance along the longitudinal direction of the brake pads.

12. The self-energizing brake caliper according to claim 2, wherein a first distance between the rotation axis and the point where the driving force acts is longer than a second distance between the rotation axis and the outer end of the first caliper arm; the first distance is the distance along the rotation axis of the brake disc; and the second distance is the distance along the longitudinal direction of the brake pads.

\* \* \* \* \*